United States Patent [19]
Zakula et al.

[11] Patent Number: 5,403,036
[45] Date of Patent: Apr. 4, 1995

[54] IGNITER FOR AN AIR BAG INFLATOR

[75] Inventors: Mitchell P. Zakula, Tempe, Ariz.;
Michael F. Daly, Tampa, Fla.;
Andrew G. Bonas, Mesa, Ariz.

[73] Assignee: TRW Inc., Lyndhurst, Ohio

[21] Appl. No.: 58,285

[22] Filed: May 4, 1993

Related U.S. Application Data

[63] Continuation-in-part of Ser. No. 755,530, Sep. 5, 1991, abandoned.

[51] Int. Cl.⁶ ............................................. B60R 21/26
[52] U.S. Cl. .................................... 280/741; 422/166; 102/202.5
[58] Field of Search ................... 280/735, 728 R, 736, 280/741; 422/166, 164, 165; 102/530, 531, 202.5; 60/256

[56] References Cited

U.S. PATENT DOCUMENTS

| | | |
|---|---|---|
| 2,440,271 | 4/1948 | Hickman . |
| 2,872,870 | 2/1959 | Gey . |
| 3,211,097 | 10/1965 | Foote . |
| 3,695,179 | 10/1972 | Rainone et al. . |
| 3,715,897 | 2/1973 | Hurley et al. . |
| 3,904,221 | 9/1975 | Shiki et al. . |
| 4,561,675 | 12/1985 | Adams et al. . |
| 4,806,180 | 2/1989 | Goetz et al. . |
| 4,919,897 | 4/1990 | Bender et al. . |
| 5,005,486 | 4/1991 | Lenzen . |
| 5,035,179 | 7/1991 | Bender et al. . |
| 5,062,367 | 11/1991 | Hayashi et al. . |

FOREIGN PATENT DOCUMENTS

| | | |
|---|---|---|
| 4001864 | 8/1990 | Germany . |
| 3937032 | 5/1991 | Germany . |
| 3939258 | 6/1991 | Germany . |
| 2214139 | 8/1989 | United Kingdom . |

Primary Examiner—Karin L. Tyson
Attorney, Agent, or Firm—Tarolli, Sundheim & Covell

[57] ABSTRACT

The present invention resides in an improved inflator for inflating a vehicle occupant restraint (12) such as an air bag. The inflator has an igniter (40). The igniter (40) comprises a container (130) which contains an ignitable particulate output charge (152). The particulate output charge (152) is retained within the container and occupies only a portion of the container. The container (130) thus has a free volume (154) equal to about 25% to about 75% of the volume of the container. The output charge (152) has a burn time in the range of 5–100 milliseconds. The container has at least one orifice means (136) closed by a rupturable disk (138). The orifice means (136) has an orifice area which is sized to contain the output charge (152) within the container (130) until at least a substantial portion of the output charge ignites. This provides a low brisance ignition.

22 Claims, 4 Drawing Sheets

IGNITER FOR AN AIR BAG INFLATOR

RELATED APPLICATION

This application is a continuation-in-part of prior application Ser. No. 755,530, filed Sep. 5, 1991, assigned to the assignee of the present application (now abandoned).

BACKGROUND OF THE INVENTION

1. Technical Field

The present invention relates to an inflatable vehicle occupant restraint, and more particularly to an igniter for igniting gas generating material to produce gas for inflating an inflatable vehicle occupant restraint, such as an air bag.

2. Description of the Prior Art

U.S. Pat. No. 3,211,097 discloses an igniter having an outer casing. The casing has at one end a nozzle port. An ignition material is contained within the casing. The ignition material comprises 97% lead dioxide and 3% boron. The casing also contains a booster material in the form of a grain. The booster material comprises 54% magnesium, 30% Teflon, and 16% Viton. The booster material is pressed into the grain configuration at pressures of 7,500 to 10,000 psi. A bridgewire ignites the ignition material, which, in turn, ignites the booster material. The booster material produces a flame which exits through the nozzle port and persists for 0.5 to 1.5 seconds. This is too long an igniter burn time for igniting gas generating material for inflating an inflatable vehicle occupant restraint, such as an air bag.

U.S. Pat. No. 3,904,221 discloses an igniter for igniting gas generating material for inflating an air bag. The igniter comprises an ignition tube which contains an ignition chemical composition. A platinum wire ignites the ignition chemical composition. The ignition is very rapid, occurring in a matter of milliseconds. The ignition generates a combustion gas which causes the ignition tube to rupture and some of the ignition chemical composition to disperse. The ignition chemical composition sprouts a flame to the outside of the ignition tube, which flame ignites the gas generating material. The gas generating material comprises relatively small tablets which are unlikely to fracture from rupture of the ignition tube and dispersal of the ignition chemical composition.

SUMMARY OF THE INVENTION

The present invention resides in an improved inflator for a vehicle occupant restraint, and igniter therein to ignite gas generating material for inflating a vehicle occupant restraint such as an air bag. The igniter comprises a container for an ignitable particulate output charge. The container has a tensile strength sufficient to withstand pressures generated within the container, without rupture of the container, when the output charge is ignited. The container has means for defining at least one orifice closed by a rupturable burst disk. The particulate output charge is retained within the container so that it occupies only a portion of the container. The container thus has a free volume. The free volume is equal to about 25% to about 75% of the volume of the container and communicates with the orifice means.

The burn time of the output charge is critical. The burn time has to be at least five (5) milliseconds in duration, for the vehicle occupant restraint, and no more than about one hundred (100) milliseconds in duration, preferably less than fifty (50) milliseconds, more preferably less than twenty (20) milliseconds.

The area of the orifice is also critical. Specifically, the orifice area is sized to contain the output charge within the container until at least a substantial portion of the output charge ignites. The material emitted from the container through the orifice is thus predominantly ignited particles, and a low brisance ignition of the gas generating material is obtained.

A preferred orifice area is less than about eight (8) square millimeters (less than about 0.012 square inch) to contain the output charge.

When the orifice area is too small, a high backpressure is created in the container. This back pressure increases the burn rate of the output charge and results in a burn time less than five (5) milliseconds. The orifice area thus has to be large enough to obtain a burn time of at least five (5) milliseconds.

A preferred orifice area is more than about 0.8 square millimeters (more than about 0.001 square inch) to obtain a burn time of at least five (5) milliseconds.

The igniter has a rapidly burning ignition material which is ignitable by a resistance wire. The rapidly burning ignition material is positioned contiguous with the output charge and ignites the output charge.

Advantages of the present invention are that the igniter has a rapid burn time which is tailored to igniting gas generating material for inflating a vehicle occupant restraint. The igniter also maintains a finite dwell time of hot particles and flame on the gas generating material to ensure ignition of the material. The stream of hot particles and flame from the igniter is directional, rather than being widely dispersed. Further, the igniter produces a low brisance ignition of the gas generating material, which protects the gas generating material against fracture during ignition.

BRIEF DESCRIPTION OF THE DRAWINGS

Further features of the present invention will become apparent to those skilled in the art to which the present invention relates from reading the following specification with reference to the accompanying drawings, in which.

DESCRIPTION OF PREFERRED EMBODIMENT

Figure 1:
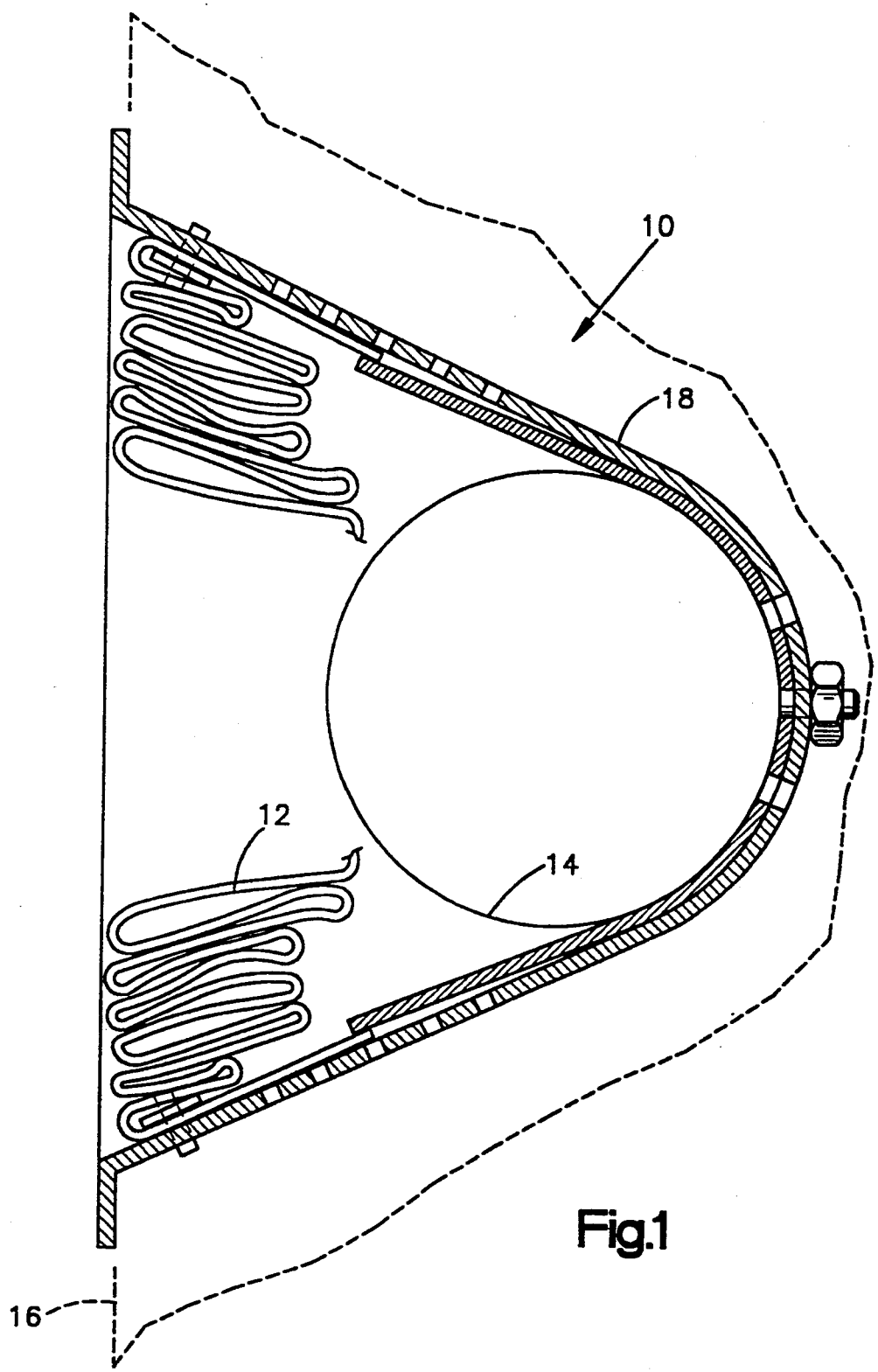
FIG. 1 is a cross-sectional view of a vehicle occupant restraint embodying the present invention and including an air bag.

An inflatable vehicle occupant restraint system 10 constructed in accordance with the present invention is illustrated in FIG. 1. The restraint system 10 is useful for both a driver's side restraint and a passenger side restraint. The restraint system 10 includes an air bag 12 shown in FIG. 1 in an inactive condition. When a vehicle containing the restraint system 10 becomes involved in a collision, the air bag 12 is expanded from the collapsed condition to an expanded condition, shown in FIG. 2. Expansion of the air bag 12 occurs by a rapid flow of gas from an inflator 14. When the air bag 12 is in the expanded condition shown in FIG. 2, it is effective to restrain movement of an occupant of the vehicle and it prevents the occupant from violently contacting structural parts of the vehicle interior.

Although the air bag 12 could be mounted on many different parts of the vehicle, it is illustrated in FIG. 1 as mounted on a dashboard 16 of the vehicle. The air bag 12 is fixed to a rigid metal reaction canister 18 which is fixed to the dashboard 16. The inflator 14 is oriented within the reaction canister 18 so that the flow of gas, indicated by arrows 20, in FIG. 2, from the inflator 14 causes the air bag 12 to expand into the passenger compartment.

Figure 3:
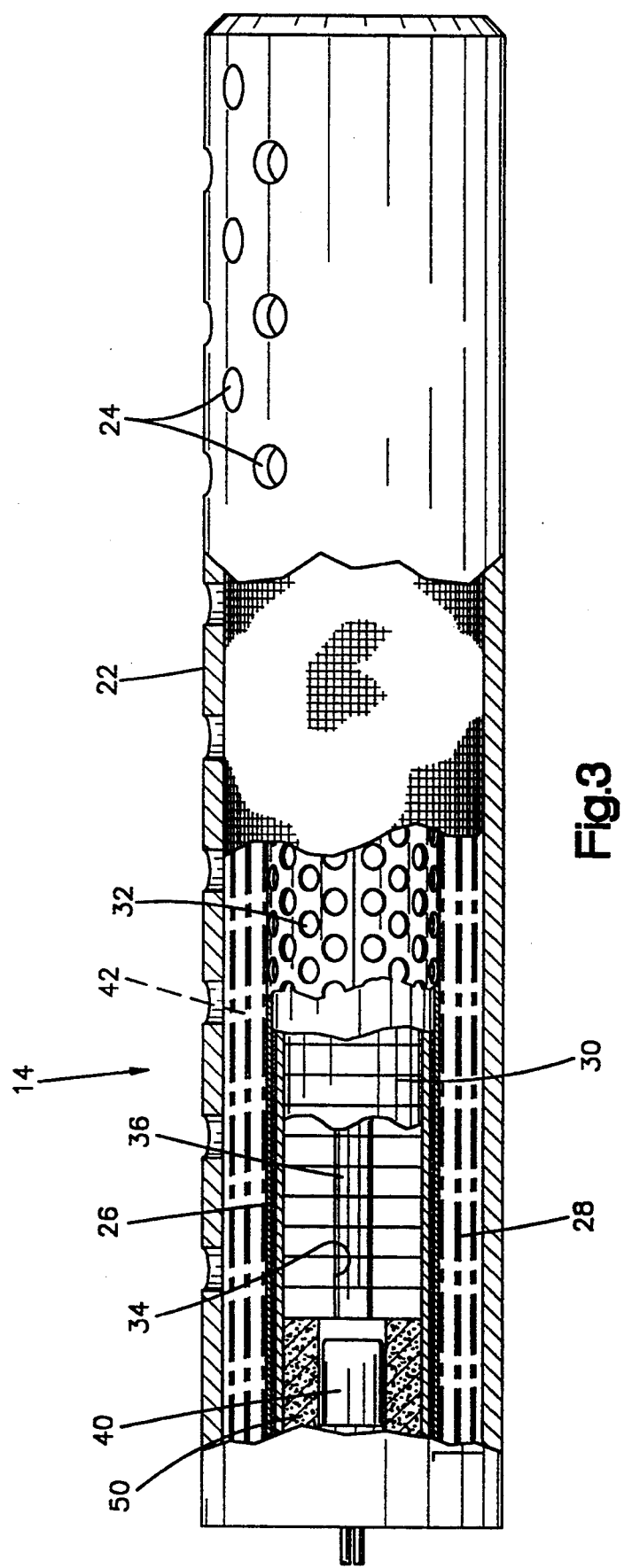
FIG. 3 is an enlarged, partial, cross-sectional view of a portion of the occupant restraint of FIG. 1 showing the inflator for the occupant restraint.

Details of the inflator 14 are shown in FIG. 3. The inflator 14 includes an elongate, generally cylindrical, outer sleeve 22 having a plurality of gas exit ports 24. The exit ports 24 are spaced in the sleeve in several parallel rows extending longitudinally along substantially the entire length of the outer sleeve 22. To accommodate a large number of exit ports 24, the ports of one row are offset, as shown, with respect to those of an adjacent row. All of the exit ports 24 of each row are spaced the same distance apart. The exit ports 24 of adjacent rows are also spaced the same distance from the exit ports in another row as they are from each other. As shown in FIG. 3, the exit ports 24 are arrayed in a relatively narrow band along one side of the outer sleeve 22, which side faces the air bag 12.

An elongate, cylindrical, inner sleeve 26 is mounted coaxial with the outer sleeve 22. The inner sleeve 26 and the outer sleeve 22 are spaced apart radially and define an annular space 28 between the sleeves. The inner sleeve 26 contains an ignitable gas generating material in the form of a plurality of gas generating wafers 30. The inner sleeve 26 is hermetically sealed and is made of a frangible material, such as a polyamide film, a phenolic impregnated paper tube, or aluminum. Although the gas generating material is shown in the form of wafers, the material may be in other shapes, such as tablets or multi-holed grains.

The annular space 28 contains a filter assembly 42 shown schematically in dashed lines. The filter assembly 42 is not a part of the present invention and will not be described in detail. In essence, the filter assembly 42 comprises a long cylindrical stainless steel combustion tube which has a plurality of gas exhaust ports 32 around the outside circumference and layers of metal mesh screen and other filter material to filter the reaction products exiting from the gas ports 32 of the combustion tube, following ignition of the gas generating wafers 30.

The gas generating wafers 30 are in the form of a plurality of flat, cylindrical, toroidal discs. Each has a central passage 34 through the wafer. The wafers 30 are arranged in a stack within the inner sleeve 26, with the passages 34 aligned to form an axial passageway 36 in the stack. The inner sleeve 26 may accommodate any number of wafers 30.

Preferably, the wafers 30 are maintained in a slightly spaced-apart relationship to expose a maximum possible outside surface area for burning. The spaced-apart relationship is obtained by an axially extending ridge (not shown) on an end face of each wafer 30 abutting an adjacent wafer. The spacing between the wafers may be filled with particles of gas generating material so that a substantially continuous phase of gas generating material is provided longitudinally within the inner sleeve 26. This ensures near instantaneous ignition of all of the wafers 30 and cushions each wafer from shock and vibration.

A variety of compositions well known to those skilled in the art can be utilized as the gas generating material for the wafers 30. A preferred composition is a mixture of sodium azide and cupric oxide, in a weight ratio of about 61% sodium azide and 39% cupric oxide. This weight ratio provides a slight stoichiometric excess of metal oxide to azide to ensure reaction of the metal oxide with substantially all of the azide. Other azides such as lithium azide can be used. Other metal oxides such as iron oxide and titanium dioxide can also be used. Also, the composition can contain other ingredients, such as an oxidant. Suitable oxidants are potassium perchlorate and sodium nitrate. The composition can also comprise a binder such as clay, strengthening fibers such as graphite fibers, and other ingredients. Preferably, no binder is used in the composition, because a binder constitutes a diluent to the composition. The wafers 30 can be coated with a booster coating.

Preferably, the wafers 30 are formed into a toroidal configuration by simply filling a die with particles of the gas generating material and then pressing the particles into the toroidal configuration, within the die. The geometry of the wafers 30 and the absence of a binder cause the wafers to be somewhat fragile. Thus, the wafers can shatter if they are ignited at too high a brisance. Shattering the wafers immediately exposes more surface area to burning, and can cause the wafers to burn at too rapid an initial rate. It is thus desirable to ignite the wafers 30 at a brisance sufficiently low to avoid shattering of the wafers.

Figure 2:
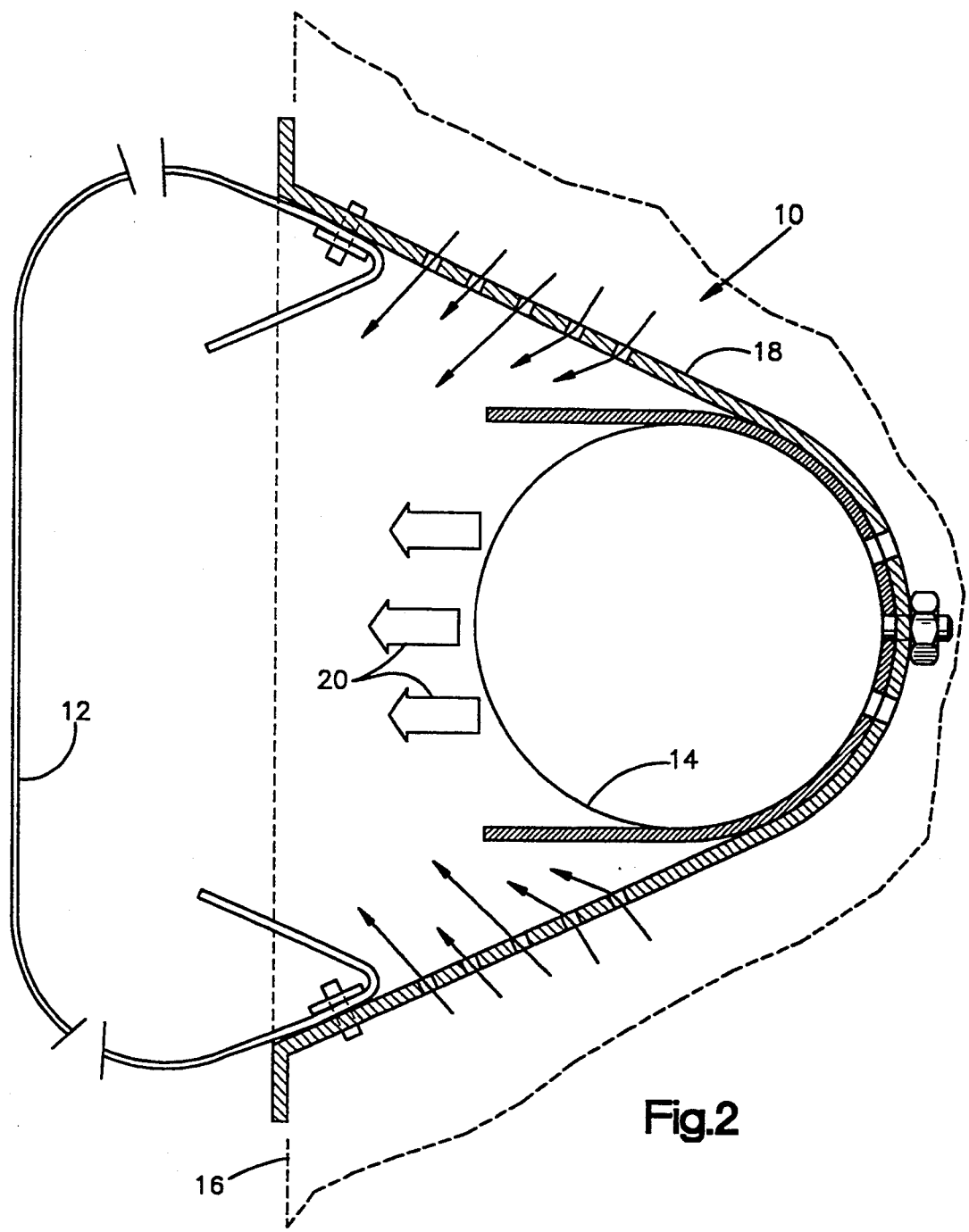
FIG. 2 is a cross-sectional view of the occupant restraint of FIG. 1 showing the air bag in an expanded condition.

The inner sleeve 26, at one end, contains an igniter assembly 40. The igniter assembly 40 is responsive to an inertial sensor (not shown) which detects a rapid change in vehicle velocity. The igniter assembly 40, when activated, projects a stream of burning particles axially through the aligned axial passages 34 of the stack of toroidal wafers 30, igniting the wafers. The burning wafers generate nitrogen gas which flows through the ports 32 of the inner sleeve 26, through the filter assembly 42 and then through the outer sleeve exit ports 24 into the air bag 12 (FIGS. 1 and 2). A cylindrical slag filter 50 encompasses the igniter assembly 40. The slag filter functions to filter any products of combustion flowing along the igniter assembly 40.

In the inflator of FIG. 3, the igniter assembly 40 is arranged so that it is positioned axially at one end of the stack of wafers 30 of gas generating material. It will be understood that the igniter assembly 40 can be seated within the axial passages 34 of at least some of the wafers 30 so that the igniter assembly 40 is surrounded by gas generating material. In such case, the igniter assembly 40 can be arranged to project a stream of burning particles radially into the wafers 30, instead of, or in addition to, axially through the aligned axial passages 34 of the wafers.

Figure 4:
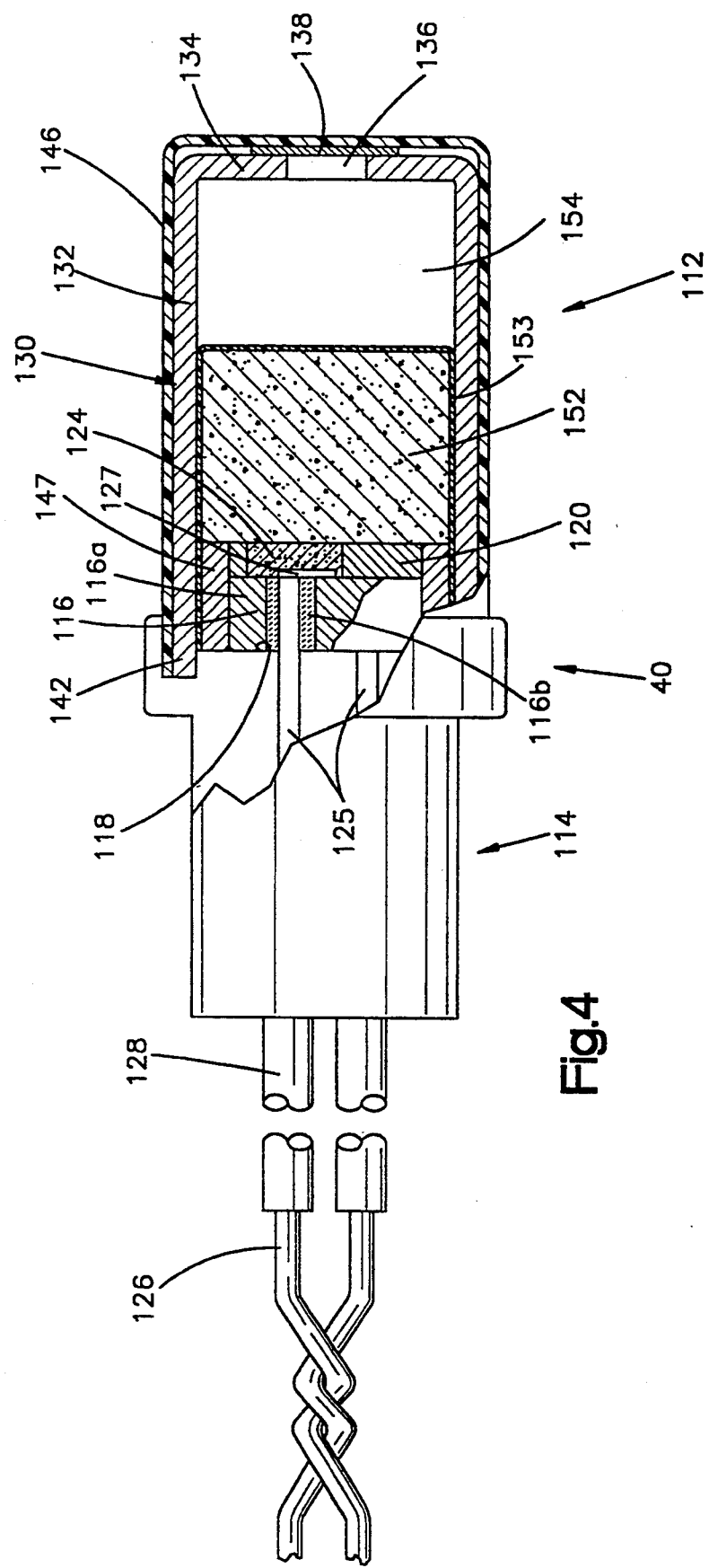
FIG. 4 is an enlarged, partial, sectional view of the igniter for the inflator of FIG. 3.

Details of the igniter assembly 40 are shown in FIG. 4. The igniter assembly 40 comprises an output charge holder 112 and a molded body 114. The molded body 114 is a cylindrical plastic piece, e.g., nylon, which is extrusion molded. A header 116 is positioned adjacent to the face 118 of the molded body 114. The header 116 comprises a cylindrical stainless steel sleeve 116a which encompasses a glass insulation material 116b. An ignition charge holder 120 is attached to the face of the header 116. The ignition charge holder 120 holds an ignition charge 124.

A pair of wire leads 126 extend through the molded body 114. The wire leads 126 are coated with polyethylene insulation 128. Pins 125 are connected to the wire leads 126. A resistance wire 127 is connected to and is an extension of one of the pins 125. The resistance wire 127 is very thin, for instance, about 0.002 inch diameter, so that it is quickly heated to a high temperature by a flow of current. The resistance wire 127 extends radially at right angles to the pin 125 to which it is connected, and is embedded in the ignition charge 124. The wire leads 126 are connected to the vehicle inertial sensor. Upon the occurrence of a collision or other sudden vehicle deceleration, the inertial sensor closes an electrical circuit. An electrical current then flows through the wire leads 126 and pins 125 to the resistance wire 127 in the header 116. The resistance wire 127 heats up and ignites the ignition charge 124.

The ignition charge 124 is a pyrotechnic material which burns very rapidly and thus is ignitable by the resistance wire 127 in the header 116. The ignition charge material 124 has a burn duration measurable in terms of microseconds ($10^{-6}$ seconds). By way of example, the ignition charge material has a nominal burn duration in the range of fifty (50) to four hundred (400) microseconds. Zirconium/potassium perchlorate is a preferred ignition charge material. Other suitable ignition charge materials 124, sensitive to a heated resistance wire, are titanium (and its hydrides)/potassium perchlorate, barium styphnate, lead styphnate, boron/calcium chromate, and boron/barium chromate. A mixture including lead styphnate, zirconium, and lead peroxide, as disclosed in U.S. Pat. No. 3,211,097, can also be used.

The output charge holder 112 comprises a cylindrical metal container 130. The metal container 130 has a relatively thick side wall 132 having a tensile strength sufficient to withstand pressures generated internally within the container, without rupture of the container. A preferred material for the container 130 is stainless steel. The container 130 also has a relatively thick end wall 134 of sufficient tensile strength to withstand pressures generated within the container, without rupture. The end wall 134 has a constricted orifice 136. However, the end wall 134 could have a plurality of orifices. Also, it will be understood by those skilled in the art that the orifice or orifices 136 can be located radially in the side wall 132 of the container 130. An orifice or orifices in the side wall 132 can be in addition to or in place of an end wall orifice or orifices.

The orifice 136, in the embodiment of FIG. 4, is coaxial with the center line of the container 130. The orifice 136 is closed by a burst disk 138 which is welded onto the outside of the end wall 134. The burst disk 138 is sufficiently thin that it ruptures when a predetermined pressure is generated within the container 130. It is understood that if there are several orifices, each orifice will be closed by a burst disk 138.

The container 130 has an end 142 opposite end wall 134. The end 142 surrounds the outer circumferential surface of the header 116. A metal adapter 147 is placed between the container end 142 and the header. The end 142 of the container 130 is then welded to the adapter 147 and to the stainless steel sleeve of the header 116 around the perimeter of the sleeve. This secures the container 130 to the header 116.

A cup-shaped thin walled insulator 146 encompasses the cylindrical container 130. The insulator 146 can be any plastic dielectric material. The purpose of the insulator 146 is to prevent metal-to-metal contact which could ground the igniter assembly 40 and disable the inflator 10.

The container 130 contains an output charge 152. The output charge 152 is preferably non-densified or unpressed particulate material. However, a densified output charge can also be used. In the embodiment shown in FIG. 4, the output charge 152 is contained by a retainer 153 so that the output charge occupies only a portion of the interior of the container 130. This leaves a free a volume designated 154 in FIG. 4. The output charge 152 is positioned at one end of the container 130 by the retainer 153 so that the output charge 152 is against the ignition charge 124. The free volume 154 is that space between the output charge 152 and the orifice 136. The retainer 153 is a thin-walled metal can that is readily ruptured following ignition of the output charge 152 and is simply strong enough to retain the output charge 152 in its position against the ignition charge 124.

The output charge 152 can occupy a greater or lesser portion of the container 130 than shown in FIG. 4. Preferably, the output charge 152 occupies from 75% to 25% of the volume of the container 130. Thus, the container 130 can have a free volume 154 in the range of 25% to 75% of the volume of the container. A preferred free volume is about 50% to about 75% of the volume of the container, more preferably about two-thirds of the volume of the container 130. Typically, the container 130 has a capacity of about one cc.

The free volume 154 is necessary to absorb the initial pressure increase within the container that occurs upon ignition of the output charge 152. Without a free volume, a high back pressure can result within the container that can cause the output charge to burn too rapidly, specifically in less than five milliseconds. This is too short a burn time for igniting the gas generating material of an inflator for a vehicle occupant restraint.

The amount of the output charge 152 is that amount required to ignite the gas generating wafers 30 in the inflator 14. This amount can vary depending upon the size of the inflator and the composition of the gas generating wafers. Preferably, the amount of the output charge which is employed is in the range of about 0.25 to 2.0 grams, more preferably, about 0.5 to 2.0 grams.

The output charge 152 can be any solid particulate, pyrotechnic material having a rapid burn rate and short burn time, and suitable for igniting the gas generating wafers. The output charge 152, however, does not have as rapid a burn rate as the ignition charge 124. The output charge 152 is distinguishable from the ignition charge 124 in that it has a burn time measurable in terms of milliseconds ($10^{-3}$ seconds), in contrast to microseconds ($10^{-6}$ seconds) for the ignition charge 124.

One suitable output charge material is a flammable metal composition which contains an oxidant. A preferred example of an output charge material of this type is boron potassium nitrate ($B/KNO_3$). This material contains about 20–26% by weight boron, about 69–73% by weight potassium nitrate, and about 1.6–6% by weight binder, e.g., a latex. Other suitable output charge materials are black powder, nitrocellulose, aluminum potassium perchlorate, tetramethylammonium perchlorate/ammonium perchlorate, a blend of ferric oxide and powdered aluminum (thermite), and metal particles mixed with a propellant such as titanium/rubber plus ammonium perchlorate. Another suitable output charge material is a blend of magnesium and Teflon or Teflon plus Viton (trademarks, E. I. DuPont de Nemours & Co.), as disclosed in U.S. Pat. No. 3,211,097. Also, a blend of boron potassium nitrate and titanium hydride potassium perchlorate can be used. This blend can be purchased from Special Devices, Inc. of Newhall, Calif.

Other output charge materials will be apparent to those skilled in the art. For instance, it is well recognized that the burn rate of a fast burning composition can be reduced by densifying, compacting, or aggregating the composition. Thus, a composition which normally may not meet the parameters of the present invention, if in a granulated, non-densified form, as having too fast a burn rate, can be conformed to the parameters by such techniques as densification, compaction, and aggregation.

The principal parameter which characterizes the present invention is the burn time for the output charge 152. Specifically, the output charge should have a burn time within the range of about five (5) to one hundred (100) milliseconds. A burn time of at least about five (5) milliseconds is necessary to ignite the gas generating material for a vehicle occupant restraint. A burn time of more than about one hundred (100) milliseconds is too slow for a vehicle occupant restraint, e.g., in an inflator to protect an occupant of a vehicle during a collision. A particularly preferred burn time is less than about fifty (50) milliseconds, more preferably in the range of about five (5) to about twenty (20) milliseconds.

The burn time of an igniter is measured as the time from the initial flow of current into the igniter to the end of combustion of the output charge of the igniter. However, the time between the initial flow of current into the igniter and the start of combustion of the output charge 152 is normally very short, for instance a fraction of a millisecond (e.g., 500 microseconds). Accordingly, it will be understood by those skilled in the art that, for the purposes of the present application, the burn time is defined as essentially that time which it takes for the output charge 152 to burn.

The burn characteristics of the output charge of the present invention are readily distinguishable from those of an igniter for a rocket. For a conventional rocket igniter, the burn time typically is measured in seconds, for instance, up to about five seconds. U.S. Pat. No. 3,211,097, by way of example, discloses a burn time of 0.5 to 1.5 seconds, as compared to milliseconds for the present invention. The relatively long burn time of the so-called booster material of the '097 patent may be due to the configuration of the booster material in the form of a grain. The grain has an axial perforation. Ignition material enters the perforation, igniting the grain. The grain burns from the inside out, along the axial perforation, to the outer surface of the grain. The relatively long burn time measured in terms of seconds, for instance five seconds, provides a relatively soft ignition. This is desirable for a solid rocket fuel and other such applications. Such a long burn time, however, is undesirable in an inflator for inflating an air bag to protect an occupant of a vehicle during a collision.

Another critical aspect of the present invention is sizing the area of the orifice 136 within a narrow window of orifice areas. Specifically, it was found that if the orifice area was too large, a substantial amount of unignited output charge material 152 would be emitted through the orifice 136. The unignited output charge material would ignite outside of the container 130. This ignition would be at a high brisance and could fracture the gas generating grains. Preferably, the orifice or orifices are sized so that the total orifice area is less than about eight (8) square millimeters (0.012 square inch). At this orifice area, or less, the output charge 152, as defined herein, can be contained within the container 130 until at least a substantial portion of the output charge ignites. Preferably, the output charge 152 is contained within the container 130 until at least about 90% of the output charge ignites. Thus, primarily only burning particles are emitted as a flame through the orifice 136 to ignite the wafers 30. This achieves a relatively soft, low intensity, low brisance ignition of the wafers 30, which protects the wafers.

With too small a total orifice area, a high back-pressure is created in the container 130 on ignition of the output charge 152. The back-pressure increases the burn rate of the output charge, as does the absence of a free volume. Thus, the total orifice area is sized to obtain, along with the free volume, a burn time of more than about five (5) milliseconds. Preferably, the orifice or orifices are sized to provide a total orifice area of at least about 0.8 square millimeters (about 0.001 square inch).

The following is a summary of preferred parameters to achieve the above objectives, using a boron potassium nitrate pyrotechnic material, or similar burning material.

Boron potassium nitrate has a density of about 1.9 grams per cc. Other similar burning materials have a similar density. Typically, the igniter container 130 has a capacity of about one cc.

| Output Pyrotechnic Charge | 0.25–2 grams |
| Free volume | 25–75% |
| Orifice area | 0.8–8 square millimeters |
| Flame length | 100–600 millimeters |

The density of 1.9 grams per cc is the density for the output charge in a loose state. The charge is readily compacted. The charge, at 0.25 gram, in a loose state, occupies a volume of about 0.48 cc, about one-half the volume of the container. It is readily compacted, using pressures up to about 1,000 psi, to permit loading up to two grams into the container.

To assemble the igniter assembly 40, the output charge 152 is first placed within the retainer 153. The resistance wire 127 and the charge holder 120 are resistance welded to the header 116. The ignition charge 124 is then placed in the charge holder 120. Thereafter, the container adapter 147 is TIG-welded to the header 116. The header 116, container adapter 147, charge holder 120, ignition charge 124, and resistance wire 127 are all inserted into and TIG-welded to the retainer 153. The resulting subassembly is then placed in the end 142 of the container 130, and the container adapter 147 and the are TIG-welded together. The insulator 146 is then placed over the container 130. The pins 125 extend from the resistance wire 127 of the header 116. The pins are connected to leads 126. The molded body 114 is extrusion molded around the component parts, in the position shown in FIG. 4, providing an integral igniter assembly 40.

The following examples illustrate the present invention.

EXAMPLE 1

A test was conducted using an igniter having essentially the same configuration as FIG. 4. The container for the output charge had a capacity of about one cc. The igniter contained about one-half (½) gram of boron potassium nitrate (B/KNO$_3$) output charge. The B/KNO$_3$ output charge had the grade designation IP-10, and a density of about 1.9 gram/cc. It occupied about one-half (½) the volume of the container. About one-half (½) of the volume of the container was free volume.

The igniter had an end wall orifice. The orifice had a diameter of about 1.6 millimeters, giving it an orifice area of about 2 square millimeters. This size orifice area and free volume gave a burn time of about eleven (11) milliseconds. The emission through the orifice was predominantly ignited particles.

EXAMPLE 2 AND 3

These Examples establish a practical maximum orifice area that can be used in the practice of the present invention, and also show that by varying the composition of the output charge, the characteristics of the igniter can be varied. The igniter in both Examples was similar to the igniter of Example 1. In Example 2, the igniter had a container end wall orifice which had a diameter of about 3.2 millimeters. This gave it an orifice area of about eight (8) square millimeters, about four times the orifice area of Example 1. In Example 3, the container had four (4) side wall orifices. However, each side wall orifice had a diameter of only about 1.6 millimeters. This gave it a total orifice area of about eight (8) square millimeters, similar in this respect to the igniter of Example 2.

The output charge in Example 2 was 0.50 grams of B/KNO$_3$. The free volume was about 50% of the volume of the container. The output charge in Example 3 was 0.75 grams of a blend of 90% B/KNO$_3$ and 10% titanium hydride/potassium perchlorate (TiH$_2$/KP), leaving a free volume of about 166 the volume of the container.

In Example 2, on ignition of the output charge, the igniter emitted, through the container orifice, a substantial amount of unburned particles which ignited outside of the igniter with a high brisance. This was considered to be unsatisfactory. The burn time was measured at eleven (11) milliseconds, but this was not considered to be meaningful because of the relatively large emission of unburned particles.

In Example 3, in contrast, on ignition of the output charge, the igniter emitted, through the container orifice, predominantly ignited particles. The output charge in Example 3 has a faster burn rate than B/KNO$_3$ alone, and the satisfactory results in Example 3, in terms of emission through the container orifice, are believed to be due to the faster burn rate.

In Example 3, the igniter had a burn time of about four (4) milliseconds. This is below the parameter of five (5) milliseconds for the present invention. Thus, Example 3 does not meet the criteria of the present invention.

However, it is believed, based on observations made with regard to Examples 2 and 3 and other observations, that the variables of amount and composition of the output charge and free volume can be adjusted, using an orifice area of about eight (8) square millimeters, so that the igniter of these Examples would meet the criteria of the present invention, namely, containment of the output charge until substantially ignited, and a burn time in the range of 5–100 milliseconds.

EXAMPLE 4

This Example shows that a relatively small orifice area can be used. The output charge was a similar blend to that of Example 3, but it contained 28% TiH$_2$/KP. 0.25 grams of the output charge were used. The container had a single end orifice, which had a diameter of one (1) millimeter. This gave an orifice area of 0.8 square millimeter. On ignition, the output charge was contained until substantially all of the output charge ignited. The output charge had a burn time of about 6.5 milliseconds.

From observations made in connection with this Example, it is believed that an orifice area of about 0.8 square millimeters is about as small as practically can be used.

EXAMPLE 5-9

These Examples illustrate successful practice of the present invention using different orifice areas, output charges, and output charge amounts. The following Table gives results achieved with respect to each Example. In the last column, satisfactory (S) means that the emission through the orifice area was predominantly ignited particles.

TABLE

| Example | Output Charge Composition | Grams of Output Charge | No. of Orifices | Orifice Diameter Millimeters | Total Orifice Area Square Millimeters | Burn Time Duration Milliseconds | Emitted Particles Satisfactory (S) Unsatisfactory (U) |
|---|---|---|---|---|---|---|---|
| 5 | B/KNO$_3$ | 0.5 | 4 | 1.02 | 3.24 | 8 | S |
| 6 | B/KNO$_3$ | 0.75 | 4 | 1.02 | 3.24 | 7* | S |
| 7 | B/KNO$_3$ w/28% TiH$_2$/KP | 0.25 | 1 | 1.32 | 1.37 | 5 | S |
| 8 | B/KNO$_3$ w/28% TiH$_2$/KP | 0.25 | 1 | 1.57 | 1.95 | 5 | S |
| 9 | B/KNO$_3$ w/5% TiH$_2$/KP | 0.75 | 4 | 1.02 | 3.24 | 5.7 | S |

*Note:
Several other tests at this orifice area, with 0.75 grams B/KNO$_3$, gave slightly different burn times, but all in the range of about 5–8 milliseconds.

From the above Examples, it will be apparent to those skilled in the art that the present invention resides in the discovery that a relatively fast burning output charge material, for which the burn time is measurable in milliseconds, can be used for the ignition of fragile gas generating grains by sizing the orifice area within a narrow range and providing a free volume in the output charge container within the range of about 25%–75% of the volume of the container. The lower limit of the orifice area is that necessary to obtain a burn time of at least about 5 milliseconds. The upper limit of the orifice area is that necessary to contain the output charge until substantially all of the output charge ignites. By containing the output charge until substantially all of it ignites, a low brisance ignition is obtained suitable for igniting fragile gas generating grains. Preferred limits for the orifice area are in the range of about 0.8 square millimeters to about eight (8) square millimeters.

From the above description of the invention, those skilled in the art will perceive improvements, changes and modifications. Such improvements, changes and modifications within the skill of the art are intended to be covered by the appended claims.

Having described the invention, the following is claimed:

1. An inflator for a vehicle occupant restraint comprising:
   (a) gas generating material;
   (b) an igniter to ignite the gas generating material for producing a low brisance flame for igniting said gas generating material, said igniter comprising:
      (i) a container including means for defining an orifice in the container, said orifice having an orifice area;
      (ii) a rupturable closure means for closing said orifice;
      (iii) a particulate output charge in said container;
      (iv) a rapidly burning ignition charge material ignitable by a resistance wire for igniting said output charge;
      (v) means for retaining said output charge within said container so that said output charge is contiguous with said rapidly burning ignition charge material and so that the output charge occupies only a portion of the container, the container having a free volume in communication with the orifice, the free volume being equal to about 25% to 75% of the volume of the container;
   said output charge when ignited having a burn time in the range of 5 to 100 milliseconds;
   said orifice area being dimensioned to contain said output charge within said container following ignition until at least a substantial portion of said output charge ignites.

2. The inflator of claim 1 wherein said output charge when ignited produces a flame which when emitted from said container is substantially free of unignited particles.

3. The inflator of claim 1 wherein said output charge has a burn time less than about 50 milliseconds.

4. The inflator of claim 1 wherein said output charge has a burn time in the range of about 5-20 milliseconds.

5. The inflator of claim 1 wherein said orifice area is sized in the range of about 0.8 to about 8 square millimeters.

6. The inflator of claim 1 wherein said output charge comprises $B/KNO_3$ or a blend of $B/KNO_3$ with titanium hydride potassium perchlorate.

7. The inflator of claim 1 wherein said output charge is essentially non-densified particulate material.

8. The inflator of claim 1 wherein said gas generating material is in the form of at least one disklike wafer.

9. The inflator of claim 8 comprising a plurality of wafers in a stacked aligned relationship wherein each of said wafers has a cylindrical configuration with a central opening, and the products of combustion of said output charge flow axially through said central openings in said wafers.

10. The inflator of claim 1 wherein said container has a generally cylindrical configuration and an end wall contiguous with said gas generating material and said orifice is in said end wall.

11. An inflator for a vehicle occupant restraint comprising:
   (a) a plurality of gas generating wafers;
   (b) an igniter in communication with said gas generating wafers to produce a low brisance flame for igniting said wafers without fracturing the wafers, said igniter comprising:
      (i) a container including means for defining an orifice in said container, said orifice having an orifice area;
      (ii) a rupturable closure means for closing said orifice;
      (iii) a particulate output charge in said container, occupying only a portion of said container and defining a free volume equal to about 25% to 75% of the volume of said container, said particulate output charge when ignited having a burn time in the range of 5 to 100 milliseconds;
      (iv) a rapidly burning ignition charge material ignitable by a resistance wire for igniting said output charge; and
      (v) means for retaining said output charge in said container so that said output charge is contiguous with said rapidly burning ignition charge material;
   said orifice area being dimensioned to contain said output charge within said container following ignition until at least a substantial portion of said output charge ignites.

12. The inflator of claim 11 wherein said output charge, when ignited, produces a flame which when emitted from said container is substantially free of unignited particles.

13. The inflator of claim 11 wherein at least 90% of the output charge ignites prior to emission of flame from said container.

14. The inflator of claim 13 wherein said orifice area is sized in the range of about 0.8 to about 8 square millimeters.

15. The inflator of claim 14 wherein said output charge is a mixture of a flammable metal and an oxidant.

16. The inflator of claim 15 wherein said output charge comprises boron potassium nitrate.

17. The inflator of claim 16 wherein said output charge has a burn time less than about 50 milliseconds.

18. The inflator of claim 17 wherein said output charge has a burn time in the range of about 5-20 milliseconds.

19. The inflator of claim 11 wherein said rupturable closure means is a disk welded to said container.

20. The inflator of claim 11 wherein said output charge is essentially non-densified particulate material.

21. The inflator of claim 11 comprising a plurality of wafers in a stacked aligned relationship wherein each of said wafers has a cylindrical configuration with a central opening, and the products of combustion of said output charge flow axially through said central openings in said wafers.

22. The inflator of claim 21 wherein said container has a generally cylindrical configuration and an end wall contiguous with said wafers and said orifice means is in said end wall.

* * * * *